United States Patent
Narita et al.

(10) Patent No.: US 9,352,715 B2
(45) Date of Patent: May 31, 2016

(54) VEHICLE BUMPER INCLUDING PEDESTRIAN COLLISION DETECTION APPARATUS

(71) Applicants: Sotaro Narita, Toyota (JP); Youichi Matsunaga, Kariya (JP); Naoki Goda, Kariya (JP)

(72) Inventors: Sotaro Narita, Toyota (JP); Youichi Matsunaga, Kariya (JP); Naoki Goda, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/435,348

(22) PCT Filed: Dec. 10, 2013

(86) PCT No.: PCT/IB2013/002713
§ 371 (c)(1),
(2) Date: Apr. 13, 2015

(87) PCT Pub. No.: WO2014/108723
PCT Pub. Date: Jul. 17, 2014

(65) Prior Publication Data
US 2015/0274109 A1    Oct. 1, 2015

(30) Foreign Application Priority Data
Jan. 9, 2013    (JP) .................................. 2013-001825

(51) Int. Cl.
*B60R 21/0136*    (2006.01)
*B60R 19/18*    (2006.01)
*B60R 19/48*    (2006.01)

(52) U.S. Cl.
CPC ............. *B60R 21/0136* (2013.01); *B60R 19/18* (2013.01); *B60R 19/483* (2013.01); *B60R 2019/1873* (2013.01)

(58) Field of Classification Search
CPC ...... B60R 19/02; B60R 19/023; B60R 19/18; B60R 19/483; B60R 21/013; B60R 21/0136
USPC ............. 293/120, 122, 133, 134; 296/187.03, 296/187.04, 187.09; 180/274
See application file for complete search history.

(56) References Cited

U.S. PATENT DOCUMENTS 6,315,339 B1 * 11/2001 Devilliers ............... B60R 19/18
293/120
6,863,322 B2 * 3/2005 Hunter .................... B29C 45/16
264/255

(Continued)

FOREIGN PATENT DOCUMENTS

DE    102009012592 A1    9/2009
JP    2005-263038 A    9/2005

(Continued)

*Primary Examiner* — Jason S Daniels
(74) *Attorney, Agent, or Firm* — Oliff PLC

(57) ABSTRACT

A vehicle bumper including a pedestrian collision detection apparatus includes: a chamber member, a pressure detector, a collision determination unit, an absorber, and a bumper cover. The chamber member is disposed in a vehicle width direction as a longitudinal direction thereof and is adjacent to an outer side surface of a bumper reinforcement in a vehicle front-rear direction, the bumper reinforcement is disposed in the vehicle width direction as a longitudinal direction thereof and inside of the chamber member functions as a pressure chamber. The pressure detector outputs a signal corresponding to a change in pressure of the pressure chamber. The bumper cover is provided on the outside of the chamber member and the absorber in the vehicle front-rear direction and includes a projected portion projected from an opposite wall that faces the chamber member to the chamber member side.

10 Claims, 3 Drawing Sheets

(56) References Cited

U.S. PATENT DOCUMENTS

| | | | |
|---|---|---|---|
| 2006/0185922 A1* | 8/2006 | Tanabe | B60R 21/0136 180/274 |
| 2009/0015391 A1 | 1/2009 | Kiribayashi | |
| 2009/0021030 A1* | 1/2009 | Tanabe | B60R 21/0136 293/117 |
| 2011/0232396 A1 | 9/2011 | Takahashi et al. | |

FOREIGN PATENT DOCUMENTS

| | | | |
|---|---|---|---|
| JP | 2009-018741 A | 1/2009 | |
| JP | DE 102009004469 A1 * | 8/2009 | ............ B60R 19/483 |
| JP | 2009-220783 A | 10/2009 | |
| JP | 2010-132040 A | 6/2010 | |
| JP | 2010-179668 A | 8/2010 | |
| JP | 2011-143825 A | 7/2011 | |

* cited by examiner

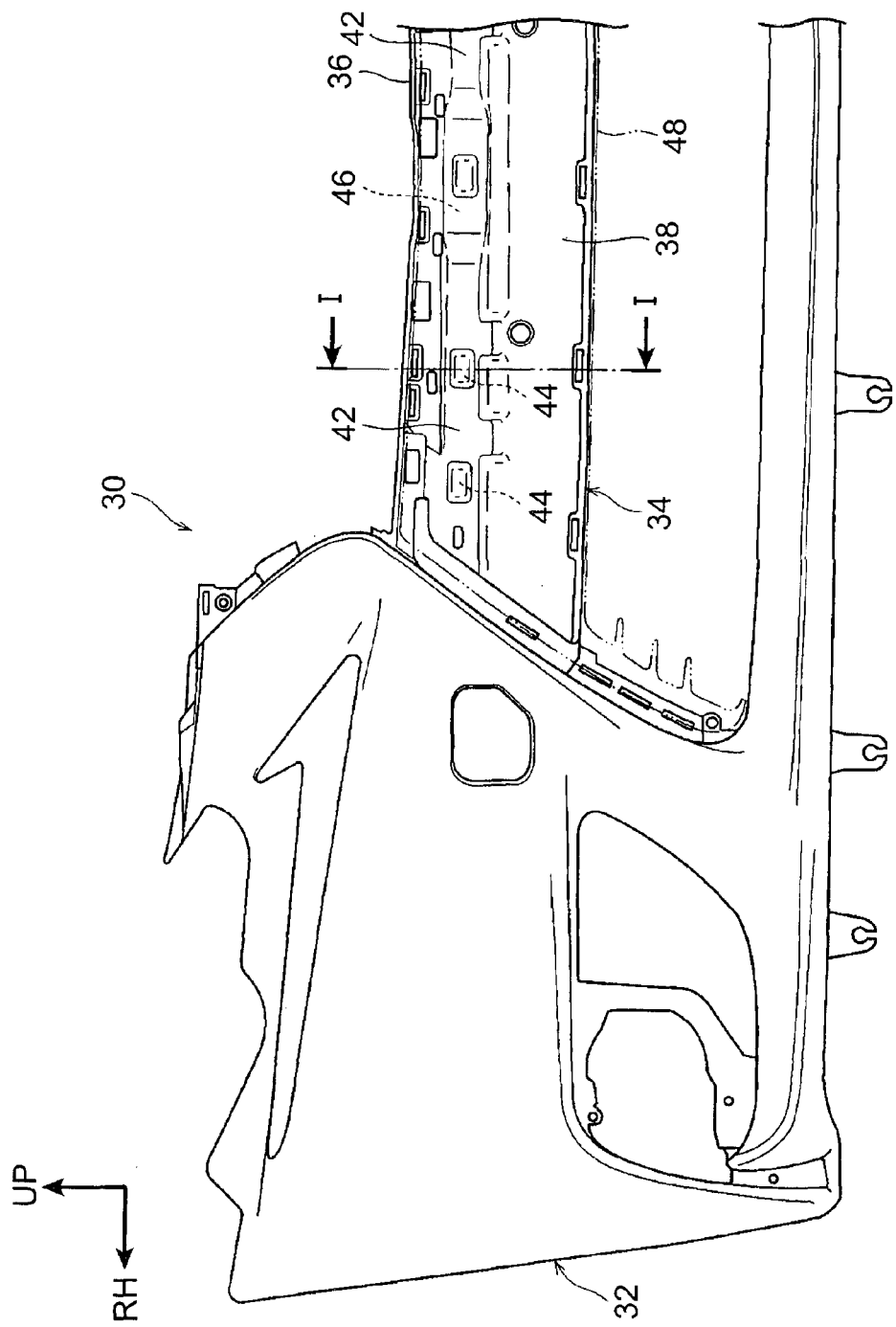

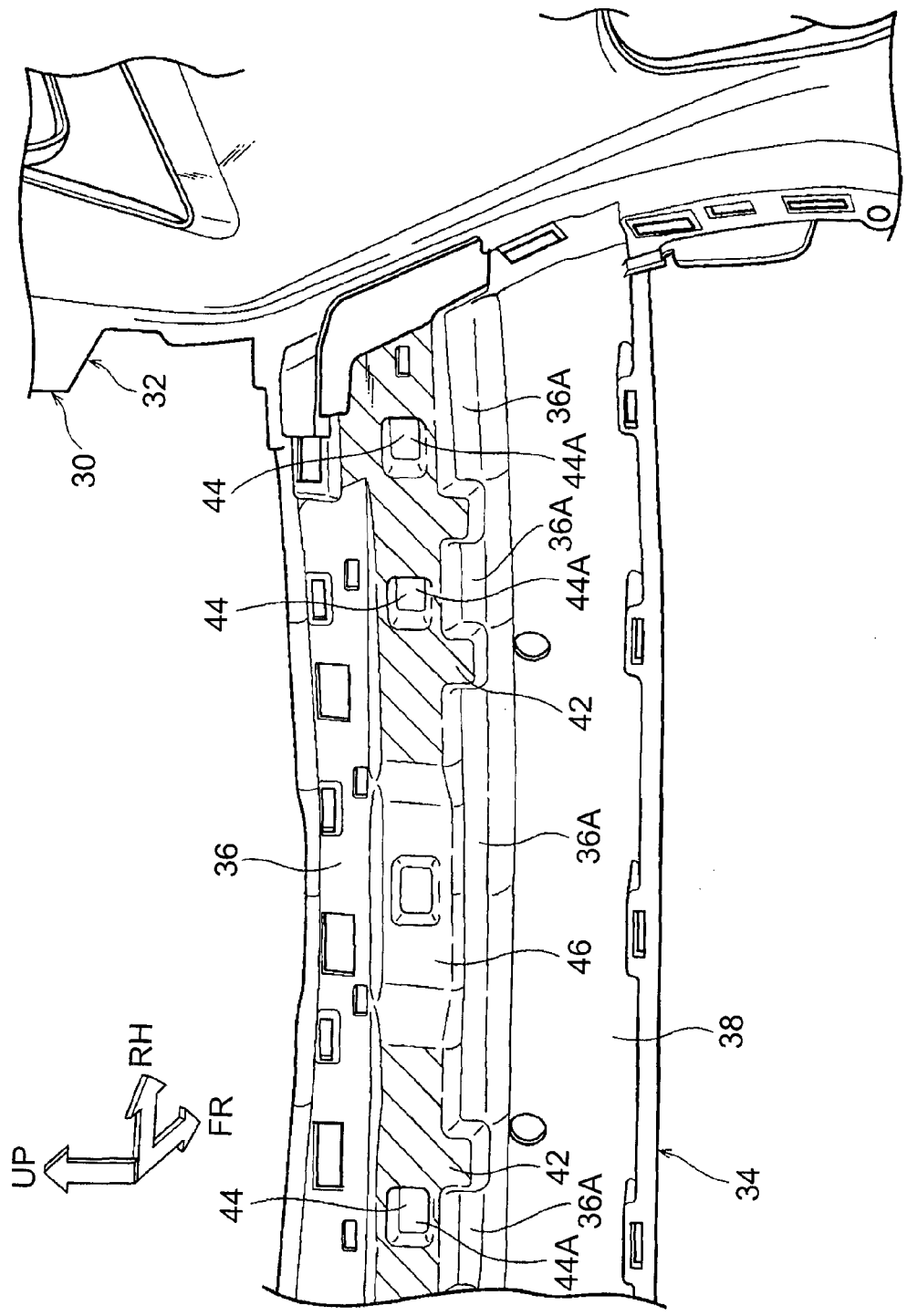

VEHICLE BUMPER INCLUDING PEDESTRIAN COLLISION DETECTION APPARATUS

BACKGROUND OF THE INVENTION

1. Field of the Invention

The present invention relates to a vehicle bumper including a pedestrian collision detection apparatus.

2. Description of Related Art

In a collision detection apparatus for a vehicle that is disclosed in Japanese Patent Application Publication No. 2010-179668 (JP 2010-179668 A), a chamber member is disposed on a vehicle front side of a bumper reinforcement. In addition, an absorber member is disposed between the bumper reinforcement and a bumper cover. The absorber member includes an absorber main body that is disposed on a vehicle lower side of the chamber member and a spacer section that is disposed on the vehicle front side of the chamber member. Accordingly, a gap between the bumper cover and the chamber member is filled by the spacer section. Furthermore, an upper portion at a front end of the spacer section is projected to the vehicle front side (bumper cover side), thereby preventing deformation of the bumper cover.

For example, during a collision of the vehicle (bumper cover) with a pedestrian, the spacer section presses the chamber member, and pressure in a chamber space in the chamber member changes. Furthermore, a pressure sensor outputs a signal that corresponds to a pressure change in the chamber space to a pedestrian protection device ECU, and then the pedestrian protection device ECU determines whether or not a collision body with the bumper cover is a pedestrian. As the collision detection apparatus for a vehicle, those disclosed in Japanese Patent Application Publication No. 2010-132040 (JP 2010-132040 A) and Japanese Patent Application Publication No. 2011-143825 (JP 2011-143825 A) can be raised.

However, because the absorber member is formed of a foaming resin material, a temperature change of the absorber member is relatively large. Thus, a structure of the vehicle collision detection apparatus in which the gap between the bumper cover and the chamber member is filled by the spacer section of the absorber member may be affected by the temperature. In addition, it is difficult to form the absorber member made of the foaming resin material in a specified thickness or less. Unfortunately, in a region where the gap between the bumper cover and the absorber member is small, such as in a corner section of the vehicle (outer end of the bumper cover in a vehicle width direction), there is a case that the spacer section cannot be disposed in the gap.

SUMMARY OF THE INVENTION

The present invention provides a vehicle bumper that includes the pedestrian collision detection apparatus whose structure is less likely to be affected by a temperature.

The vehicle bumper that includes the pedestrian collision detection apparatus according to one aspect of the present invention includes: a bumper reinforcement that is disposed in a vehicle width direction as a longitudinal direction thereof; a chamber member that is disposed in the vehicle width direction as a longitudinal direction thereof and is adjacent to an outer side surface of the bumper reinforcement in a vehicle front-rear direction, inside of the chamber member functioning as a pressure chamber; a pressure detector that outputs a signal corresponding to a change in pressure of the pressure chamber; a collision determination unit that determines whether or not a vehicle collides with a pedestrian by the signal output from the pressure detector; an absorber that is provided on a vehicle lower side of the chamber member, is adjacent to the outer side surface of the bumper reinforcement in the vehicle front-rear direction, and is disposed in the vehicle width direction as a longitudinal direction thereof; and a bumper cover that is provided on the outside of the chamber member and the absorber in the vehicle front-rear direction and includes a projected portion that is projected from an opposite wall that faces the chamber member to the chamber member side.

Here, the outer side surface of the bumper reinforcement in the vehicle front-rear direction corresponds to a surface on a vehicle front side of the bumper reinforcement that is provided in a vehicle front side and a surface on a vehicle rear side of the bumper reinforcement that is provided in a vehicle rear side.

In the vehicle bumper according to the aspect, the chamber member and the absorber are covered with the bumper cover from the outer side in the vehicle front-rear direction. Then, in a collision of a vehicle (bumper cover) with a collision body such as a pedestrian, collision energy is absorbed when the bumper cover presses the absorber. At this time, the bumper cover also presses the chamber member, and the pressure in the pressure chamber is changed. Then, the pressure detector outputs a signal that corresponds to a pressure change in the pressure chamber to the collision determination unit, and the collision determination unit determines whether or not the collision body that collides with the vehicle (bumper cover) is a pedestrian.

Here, the bumper cover includes a projected portion, and the projected portion is projected from an opposite wall of the bumper cover that faces the chamber member to the chamber member side. Accordingly, the absorber is not interposed in a gap between the bumper cover and the chamber member, and the gap is filled by the projected portion. Therefore, the vehicle bumper that includes the pedestrian collision detection apparatus can have a structure that is less likely to be affected by the temperature.

In the above aspect, the bumper cover may include a lower side wall that is disposed on a vehicle lower side of the opposite wall and on the outside of the opposite wall in the vehicle front-rear direction, a lower end of the opposite wall and an upper end of the lower side wall may be connected in a stepped shape, and the projected portions may be provided in plural with a space therebetween in the vehicle width direction.

It is possible with the above vehicle bumper to favorably determine whether the vehicle collides with a pedestrian or a collision body other than the pedestrian (such as a road side marker or a post cone).

In other words, the pedestrian is collapsed on a hood of the vehicle in a collision of the vehicle with the pedestrian. Thus, a collision load to the obliquely downward of the vehicle in the vehicle front-rear direction is mainly applied to the bumper cover from the pedestrian. Because the lower end of the opposite wall and the upper end of the lower side wall are connected in the stepped shape in the side view, mainly the opposite wall is bent and deformed (tilted) to the obliquely downward of the vehicle on the inner side in the vehicle front-rear direction with the lower end of the opposite wall as a fulcrum, and then the chamber member is pressed by the opposite wall.

Meanwhile, in the collision of the vehicle with the collision body other than the pedestrian, the collision body enters the bumper cover in a substantially horizontal manner. Thus, the collision load to an inner side in the vehicle front-rear direction is mainly applied to the bumper cover. Here, because the lower end of the opposite wall and the upper end of the lower side wall are connected in the stepped shape in the side view, the opposite wall and the lower side wall are prevented from being bent and deformed to the inner side in the vehicle front-rear direction by the portion that is formed in the stepped shape. Consequently, compared to a deformation amount of the chamber member in the collision of the vehicle with the pedestrian, the deformation amount of the chamber member becomes small in the collision of the vehicle with the collision body other than the pedestrian. In other words, a huge difference is produced between the deformation amount of the chamber member in the collision of the vehicle with the pedestrian and the deformation amount of the chamber member in the collision of the vehicle with the collision body other than the pedestrian.

Furthermore, the projected portions are provided in plural with a space therebetween in the vehicle width direction. In other words, the opposite wall is formed in the concave-convex shape in the plan view. Thus, bending rigidity of the opposite wall in the vehicle front-rear direction in the plan view is prevented from becoming excessively high. Accordingly, in the collision of the vehicle with the pedestrian, for example, the opposite wall is bent and deformed to the chamber member side moderately, and the chamber member is pressed and deformed by the opposite wall. Therefore, it is possible to favorably determine whether the vehicle collides with the pedestrian or the collision body other than the pedestrian.

In the above aspect, an extension that constitutes a vehicle design is provided on an outer side of the projected portion in the bumper cover in the vehicle front-rear direction.

According to the above aspect, the projected portion is prevented from being exposed by the extension. Therefore, it is possible to prevent degradation of the vehicle design even in a case where the bumper cover is provided with the projected portion.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a front view for showing a vehicle right half of a bumper cover used for the front bumper shown in FIG. 1; and FIG. 3 is a perspective view in which primary components of the bumper cover shown in FIG. 2 are seen from a rear side of a vehicle.

DETAILED DESCRIPTION OF EMBODIMENTS

Figure 1:
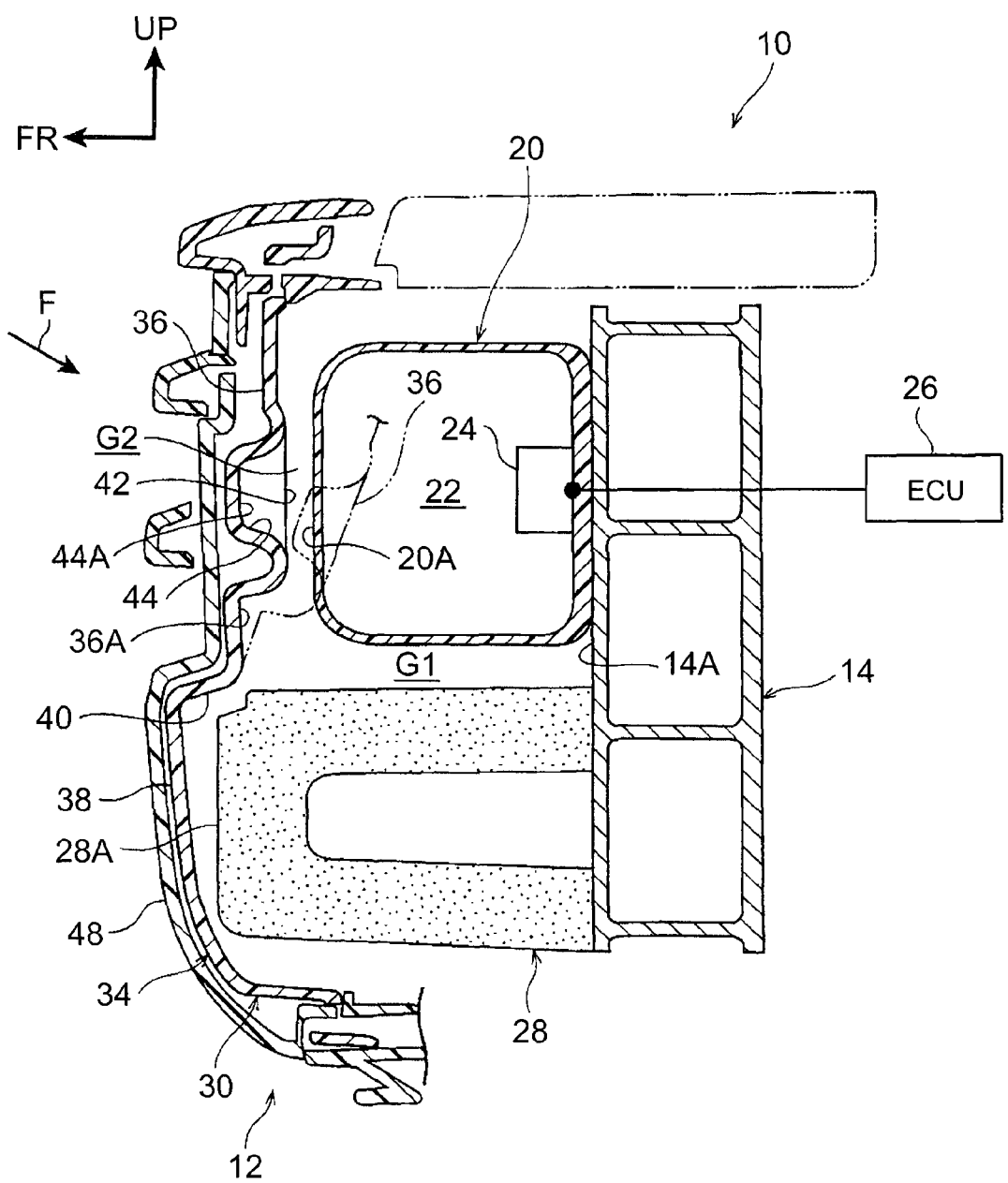
FIG. 1 is a sectional side view (cross-sectional view by the line I-I of FIG. 2) for schematically showing a structure of a front bumper including a collision determination system according to an embodiment.

A description will hereinafter be made on a front bumper 12 that includes a collision determination system 10 according to this embodiment with reference to the drawings. It should be noted that the collision determination system 10 functions as a pedestrian collision detection apparatus of the present invention and that the front bumper 12 functions as a vehicle bumper of the present invention. An arrow FR that is appropriately shown in the drawings indicates a vehicle front side, an arrow RH indicates a vehicle right side (one side in a vehicle width direction), and an arrow UP indicates a vehicle upper side.

As shown in FIG. 1, the collision determination system 10 is applied for the front bumper 12 that is disposed at a front end of a vehicle (automobile) to determine (presence or absence of) collision against the front bumper 12. A specified description will hereinafter be made thereon.

The front bumper 12 includes a bumper reinforcement (hereinafter referred to as a "bumper R/F") 14 that is a bumper frame member. The bumper R/F 14 is made of a metal material such as a ferrous or aluminum material and is configured as the frame member disposed in a vehicle width direction as a longitudinal direction thereof. In addition, the bumper R/F 14 extends between front ends of a right and left pair of front side members (not shown) that constitute a frame member on a vehicle body side and is supported by a vehicle body. Both side portions of the bumper R/F 14 in the vehicle width direction are tilted toward a vehicle rear side as approaching both sides thereof in the vehicle width direction in a plan view.

A chamber member 20 that is formed of a resin material is provided on an outer side in a vehicle front-rear direction, that is, on the vehicle front side of the bumper R/F 14. The chamber member 20 is configured as a hollow structural body that is disposed in the vehicle width direction as a longitudinal direction thereof and fixedly attached to a front surface 14A (outer side surface in the vehicle front-rear direction) of the bumper R/F 14. Both side portions of the chamber member 20 in the vehicle width direction are tilted toward the vehicle rear side as approaching the both sides in the vehicle width direction along the bumper R/F 14 in the plan view. Both ends of the chamber member 20 in the longitudinal direction thereof are set in the substantially same positions as both ends of the bumper R/F 14.

The chamber member 20 has sufficient rigidity to maintain its shape (hollow cross-sectional shape) in a state that it is fixedly attached to the bumper R/F 14 as described above. The chamber member 20 includes a communication hole that is communicated with the atmosphere in a position, which is not shown. Thus, a pressure chamber 22 that is an inner space of the chamber, member 20 is usually (statically) under the atmospheric pressure. When receiving a relatively small compressive load from the vehicle front side, the chamber member 20 is crushed while letting the air out from the communication hole, and consequently the internal pressure of the pressure chamber 22 is dynamically changed to reduce a volume of the pressure chamber 22.

Furthermore, the collision determination system 10 includes a pressure sensor 24. The pressure sensor 24 is electrically connected to an ECU 26 that functions as a collision determination unit. The pressure sensor 24 outputs a signal that corresponds to the pressure in the pressure chamber 22 to the ECU 26. The ECU 26 calculates the collision load based on the output signal from the pressure sensor 24. A collision speed sensor (not shown) is electrically connected to the ECU 26. The collision speed sensor outputs a signal that corresponds to a speed of collision with a collision body to the ECU 26, and the ECU 26 calculates the collision speed based on the output signal from the collision speed sensor. Then, the ECU 26 further calculates an effective mass of the collision body from the thus-calculated collision load and collision speed, and also determines whether or not the effective mass exceeds a threshold value in order to determine whether the collision body against the front bumper 12 is a pedestrian or something other than the pedestrian (such as a road side marker, or post cone, for example).

On the vehicle front side of the bumper R/F 14, an absorber 28 is provided on a vehicle lower side of the chamber member 20. The absorber 28 is formed of a foaming resin material, including urethane foam, and is disposed in the vehicle width direction as a longitudinal direction thereof. In addition, the absorber 28 is formed in a substantially C shape in which a vehicle rear side thereof is opened in a sectional side view, and a rear end thereof is fixed to (brought into contact with) the front surface 14A of the bumper R/F 14. Both side portions of the absorber 28 in the vehicle width direction are tilted toward the vehicle rear side as approaching the both sides in the vehicle width direction along the bumper R/F 14 in the plan view. Furthermore, a gap G1 is formed between a lower surface of the chamber member 20 and an upper surface of the absorber 28. The gap G1 is formed such that the chamber member 20 does not interfere with the absorber 28 when a bumper cover 30, which will be described below, presses the chamber member 20 to cause deformation of the chamber member 20.

The front bumper 12 includes the bumper cover 30 that is formed of a resin material or the like. The bumper cover 30 is disposed on the vehicle front side of the chamber member 20 and the absorber 28, and a portion thereof (not shown) is fixed to and supported by the vehicle body at its unillustrated portion. A gap G2 is formed between the bumper cover 30 and the chamber member 20. In other words, the absorber 28 is not interposed between the bumper cover 30 and the chamber member 20, and, in the collision of the vehicle (bumper cover 30) with the collision body such as the pedestrian, the bumper cover 30 is deformed to press the chamber member 20. Both side portions of the bumper cover 30 in the vehicle width direction are tilted toward the vehicle rear side as approaching the both sides in the vehicle width direction in the plan view. Accordingly, a dimension of the gap G2 in the vehicle front-rear direction at the center of the front bumper 12 in the vehicle width direction is set larger than a dimension of the gap G2 in the vehicle front-rear direction at both ends of the front bumper 12 in the vehicle width direction.

As shown in FIG. 2, the bumper cover 30 includes a main body 32, and the main body 32 is formed in a substantially U shape that is opened to the vehicle upper side in a front view. The bumper cover 30 also includes a center wall 34 at the center of the bumper cover 30 in the vehicle width direction, and the center wall 34 is disposed to face the chamber member 20 and the absorber 28. The center wall 34 is formed to be a substantially long plate and extends between both ends of the main body 32 in the vehicle width direction, the vehicle width direction being a longitudinal direction thereof. In other words, in the front bumper 12, the center wall 34 is disposed to face the absorber 28 and the chamber member 20 at the center of the front bumper 12 in the vehicle width direction (in a portion where the dimension of the gap G2 in the vehicle front-rear direction is relatively large). In addition, in the front bumper 12, the main body 32 is disposed to face the absorber 28 and the chamber member 20 at the both ends of the front bumper 12 in the vehicle width direction (in portions where the dimension of the gap G2 in the vehicle front-rear direction is relatively small).

As shown in FIG. 1, an upper portion of the center wall 34 is adapted to be an opposite wall 36, and the opposite wall 36 is disposed to face a front surface 20A of the chamber member 20. Meanwhile, a lower portion of the center wall 34 is adapted to be a lower side wall 38, and the lower side wall 38 is disposed to face a front surface 28A of the absorber 28. The lower side wall 38 is disposed on the vehicle front side than the opposite wall 36, and an upper end of the lower side wall 38 and a lower end of the opposite wall 36 are connected by a connecting portion 40 that extends in the vehicle front-rear direction in the side view. Accordingly, the lower end of the opposite wall 36 and the upper end of the lower side wall 38 are connected in a stepped shape in the side view.

Furthermore, as shown in FIG. 3, projected portions 42 are integrally formed in the opposite wall 36 (see shaded portions in FIG. 3). The projected portion 42 is projected to the vehicle rear side (to the chamber member 20 side) from a general surface 36A of the opposite wall 36 and is disposed to face the front surface 20A of the chamber member 20. Accordingly, the gap G2 at the center of the bumper cover 30 in the vehicle width direction is configured to be filled by the projected portion 42.

In addition, the projected portion 42 is formed in a substantially rectangular shape when seen from the vehicle rear side, and a lower side portion of the projected portion 42 is formed in a concave-convex shape when seen from the vehicle front side. Furthermore, plural (two in the embodiment) dents 44 that are opened to the vehicle rear side are formed in the projected portion 42, and each of the dents 44 is formed in a substantially rectangular shape when seen from the vehicle rear side and is aligned in the vehicle width direction. A bottom surface 44A of the dent 44 is formed on the same plane as the general surface 36A (see FIG. 1).

As shown in FIG. 3, the projected portions 42 are formed in plural while having a space therebetween in the vehicle width direction. In other words, a concave portion 46 that is opened to the vehicle rear side is formed between the projected portions 42 that are adjacent to each other in the vehicle width direction, and the opposite wall 36 is formed in the concave-convex shape in the plan view. Furthermore, the concave portion 46 is disposed on the vehicle rear side than the general surface 36A of the opposite wall 36.

Moreover, as shown in FIG. 1 and FIG. 2, a portion of the bumper cover 30 on the vehicle front side of the center wall 34 is assembled with an extension 48 that constitutes a design of the vehicle. Accordingly, the center wall 34 is covered with the extension 48 from the vehicle front side.

Next, the function and effects of this embodiment will be described.

In the front bumper 12 that includes the collision determination system 10 configured as above, the absorber 28 is provided on the vehicle lower side, of the chamber member 20, and the bumper cover 30 is provided on the vehicle front side of the chamber member 20 and the absorber 28. The center wall 34 is formed at the center of the bumper cover 30 in the vehicle width direction, and the opposite wall 36 of the center wall 34 is disposed to face the front surface 20A of the chamber member 20.

Here, the opposite wall 36 of the bumper cover 30 is integrally formed with the projected portion 42, and the projected portion 42 is projected from the opposite wall 36 to the chamber member 20 side (vehicle rear side). In other words, it is configured in the front bumper 12 that the absorber 28 is not interposed between the bumper cover 30 and the chamber member 20, that the gap G2 between the bumper cover 30 and the chamber member 20 is filled by the projected portion 42, and that the projected portion 42 presses the front surface 20A of the chamber member 20. Accordingly, the front bumper 12 can adopt a structure that is less likely to be affected by the temperature.

Because the chamber member 20 and the main body 32 of the bumper cover 30 are disposed to face each other in corner portions of the vehicle (both ends of the bumper cover 30 in the vehicle width direction), the chamber member 20 can be pressed by the main body 32. Accordingly, in a portion of the front bumper 12 where the dimension of the gap G2 in the vehicle front-rear direction is relatively small, the chamber member 20 can be pressed by the main body 32 without using the absorber 28 that is difficult to be formed in a specified thickness or less.

Furthermore, the lower side wall 38 of the bumper cover 30 that faces the absorber 28 is disposed on the vehicle front side than the opposite wall 36, and the lower end of the opposite wall 36 and the upper end of the lower side wall 38 are connected in the stepped shape in the side view. Moreover, the plural projected portions 42 are provided with the space therebetween in the vehicle width direction. Accordingly, it is possible to favorably determine whether what has collided with the vehicle is the pedestrian or the collision body other than the pedestrian (such as a road side marker or a post cone, for example).

In other words, the pedestrian is collapsed on a hood of the vehicle in a collision of the vehicle with the pedestrian. Thus, a collision load to the rear and obliquely downward of the vehicle is mainly applied to the bumper cover 30 from the pedestrian (see an arrow F in FIG. 1). Here, because the lower end of the opposite wall 36 and the upper end of the lower side wall 38 are connected in the stepped shape in the side view, mainly the opposite wall 36 is bent and deformed (tilted) to the rear and obliquely downward of the vehicle with the lower end of the opposite wall 36 as a fulcrum, and then the chamber member 20 is pressed by the opposite wall 36 (see a two-dot chain line in FIG. 1).

Meanwhile, in the collision of the vehicle with the collision body other than the pedestrian, the collision body enters the bumper cover 30 in a substantially horizontal manner. Thus, the collision load to the vehicle rear side is mainly applied to the bumper cover 30. Here, because the lower end of the opposite wall 36 and the upper end of the lower side wall 38 are connected in the stepped shape in the side view, the opposite wall 36 and the lower side wall 38 are prevented from being bent and deformed to the vehicle rear side by the portion that is formed in the stepped shape. Consequently, compared to a deformation amount of the chamber member 20 in the collision of the vehicle with the pedestrian, the deformation amount of the chamber member 20 becomes small in the collision of the vehicle with the collision body other than the pedestrian. In other words, a large difference is caused between the deformation amount of the chamber member 20 in the collision of the vehicle with the pedestrian and the deformation amount of the chamber member 20 in the collision of the vehicle with the collision body other than the pedestrian.

The projected portions 42 are provided in plural with the space therebetween in the vehicle width direction. That is, the opposite wall 36 is formed in the concave-convex shape in the plan view. Thus, bending rigidity of the opposite wall 36 in the vehicle front-rear direction in the plan view is prevented from becoming excessively high. Accordingly, in the collision of the vehicle with the pedestrian, for example, the opposite wall 36 is bent and deformed to the chamber member 20 side in an appropriate manner, and the chamber member 20 is pressed and deformed by the opposite wall 36. Therefore, it is possible to favorably determine whether the vehicle collides with the pedestrian or the collision body other than the pedestrian.

Furthermore, the extension 48 is provided on the vehicle front side of the projected portion 42 in the bumper cover 30. Accordingly, the projected portion 42 is prevented from being exposed to the outside by the extension 48. Therefore, even when the projected portion 42 is provided in the bumper cover 30, it is possible to prevent degradation of the vehicle design.

In this embodiment, the concave portion 46 of the center wall 34 is provided on the vehicle rear side than the general surface 36A of the opposite wall 36. However, the concave portion 46 may be provided on the same plane as the general surface 36A or may be provided on the vehicle front side than the general surface 36A.

In this embodiment, the projected portions 42 are aligned in a row in the vehicle width direction. For example, instead of the above, a length of the projected portion 42 may be set to be short in a vehicle up-down direction. In this case, the projected portions may be arranged in a plurality of rows, each of the rows may have a plurality of the projected portions arranged in the vehicle width direction and the rows may be arranged in a vehicle up-down direction.

The projected portion 42 is formed in the substantially rectangular shape when seen from the vehicle rear side, and the lower side portion of the projected portion 42 is formed in the concave-convex shape when seen from the vehicle front side. However, the projected portion 42 is not limited to this shape. For example, the projected portion 42 may be formed in the substantially rectangular shape when seen from the vehicle rear side, and the lower side portion of the projected portion 42 may be formed to be linear. In this case, the dents 44 may be set to align in the vehicle up-down direction and the vehicle width direction.

The length of the center wall 34 in the vehicle width direction and the length of the gap G2 in the vehicle front-rear direction of this embodiment can be set in any length. In other words, the length of the center wall 34 in the vehicle width direction and the length of the gap G2 in the vehicle front-rear direction can appropriately be set according to various types of vehicles.

In this embodiment, the collision determination system 10 is applied to the front bumper 12. However, the present invention is not limited to this. The above structure may be inverted longitudinally, and the collision determination system 10 may be applied to a rear bumper.

What is claimed is:

1. A vehicle bumper including a pedestrian collision detection apparatus comprising:
   a bumper reinforcement that is disposed in a vehicle width direction as a longitudinal direction thereof;
   a chamber member that is disposed in the vehicle width direction as a longitudinal direction thereof and is adjacent to an outer side surface of the bumper reinforcement in a vehicle front-rear direction, inside of the chamber member functioning as a pressure chamber;
   a pressure detector that outputs a signal corresponding to a change in pressure of the pressure chamber;
   a collision determination unit that determines whether or not a vehicle collides with a pedestrian by the signal output from the pressure detector;
   an absorber that is provided on a vehicle lower side of the chamber member, is adjacent to the outer side surface of the bumper reinforcement in the vehicle front-rear direction, and is disposed in the vehicle width direction as a longitudinal direction thereof; and
   a bumper cover that is provided on the outside of the chamber member and the absorber in the vehicle front-rear direction and includes a projected portion that is projected from an opposite wall that faces the chamber member to the chamber member side, wherein the bumper cover includes a lower side wall that is disposed on a vehicle lower side of the opposite wall and on the outside of the opposite wall in the vehicle front-rear direction, a lower end of the opposite wall and an upper end of the lower side wall are directly connected in a stepped shape by a connecting portion that extends in the vehicle front-rear direction in the side view, and wherein the bumper cover has a plurality of the projected portions arranged at intervals in the vehicle width direction.

2. The vehicle bumper according to claim 1, wherein:
the projected portions are arranged in a plurality of rows;
each of the plurality of rows has a plurality of the projected portions arranged in the vehicle width direction; and
the plurality of rows are arranged in a vehicle up-down direction.

3. The vehicle bumper according to claim 1, wherein
the bumper cover includes a center wall at a center of the bumper cover in the vehicle width direction and a main body,
the main body is formed in a substantially U shape that is opened to a vehicle upper side in a front view,
the center wall is disposed to face the chamber member and the absorber, and
the center wall is formed to be a substantially long plate, extends between both ends of the main body in the vehicle width direction, and is disposed in the vehicle width direction as a longitudinal direction thereof.

4. The vehicle bumper according to claim 1, wherein
the projected portion is formed in a substantially rectangular shape when seen from a vehicle rear side,
a lower side portion of the projected portion is formed in a concave-convex shape when seen from a vehicle front side, plural dents that are opened to the vehicle rear side being further formed in the projected portion, and
each of the dents is formed in substantially rectangular shapes when seen from the vehicle rear side, and the dents are aligned in the vehicle width direction.

5. The vehicle bumper according to claim 1, wherein an extension that constitutes a design of the vehicle is provided on an outer side of the projected portion in the bumper covers in the vehicle front-rear direction.

6. The vehicle bumper according to claim 1, wherein plural dents that are opened to a vehicle rear side being further formed in the projected portion, and the dents are projected from the opposite wall side to the outside in the vehicle front-rear direction.

7. The vehicle bumper according to claim 4, wherein the dents are projected from the opposite wall side to the outside in the vehicle front-rear direction.

8. The vehicle bumper according to claim 5, wherein plural dents that are opened to a vehicle rear side being further formed in the projected portion, and the dents are projected from the opposite wall side to the extension.

9. A vehicle bumper including a pedestrian collision detection apparatus comprising:
a bumper reinforcement that is disposed in a vehicle width direction as a longitudinal direction thereof;
a chamber member that is disposed in the vehicle width direction as a longitudinal direction thereof and is adjacent to an outer side surface of the bumper reinforcement in a vehicle front-rear direction, inside of the chamber member functioning as a pressure chamber;
a pressure detector that outputs a signal corresponding to a change in pressure of the pressure chamber;
a collision determination unit that determines whether or not a vehicle collides with a pedestrian by the signal output from the pressure detector;
an absorber that is provided on a vehicle lower side of the chamber member, is adjacent to the outer side surface of the bumper reinforcement in the vehicle front-rear direction, and is disposed in the vehicle width direction as a longitudinal direction thereof; and
a bumper cover that is provided on the outside of the chamber member and the absorber in the vehicle front-rear direction and includes a projected portion that is projected from an opposite wall that faces the chamber member to the chamber member side, wherein the bumper cover has a plurality of the projected portions arranged at intervals in the vehicle width direction, wherein
the bumper cover includes a center wall at a center of the bumper cover in the vehicle width direction and a main body,
the main body is formed in a substantially U shape that is opened to a vehicle upper side in a front view,
the center wall is disposed to face the chamber member and the absorber, and
the center wall is formed to be a substantially long plate, extends between both ends of the main body in the vehicle width direction, and is disposed in the vehicle width direction as a longitudinal direction thereof.

10. A vehicle bumper including a pedestrian collision detection apparatus comprising:
a bumper reinforcement that is disposed in a vehicle width direction as a longitudinal direction thereof;
a chamber member that is disposed in the vehicle width direction as a longitudinal direction thereof and is adjacent to an outer side surface of the bumper reinforcement in a vehicle front-rear direction, inside of the chamber member functioning as a pressure chamber;
a pressure detector that outputs a signal corresponding to a change in pressure of the pressure chamber;
a collision determination unit that determines whether or not a vehicle collides with a pedestrian by the signal output from the pressure detector;
an absorber that is provided on a vehicle lower side of the chamber member, is adjacent to the outer side surface of the bumper reinforcement in the vehicle front-rear direction, and is disposed in the vehicle width direction as a longitudinal direction thereof; and
a bumper cover that is provided on the outside of the chamber member and the absorber in the vehicle front-rear direction and includes a projected portion that is projected from an opposite wall that faces the chamber member to the chamber member side, wherein the bumper cover has a plurality of the projected portions arranged at intervals in the vehicle width direction,
wherein plural dents that are opened to a vehicle rear side being further formed in the projected portion, and the dents are projected from the opposite wall side to the outside in the vehicle front-rear direction.

* * * * *